United States Patent
Jo et al.

(10) Patent No.: US 11,898,012 B2
(45) Date of Patent: Feb. 13, 2024

(54) POLY(AMIDE-IMIDE) COPOLYMER, COMPOSITION FOR PREPARING POLY(AMIDE-IMIDE) COPOLYMER, ARTICLE INCLUDING POLY(AMIDE-IMIDE) COPOLYMER, AND DISPLAY DEVICE INCLUDING THE ARTICLE

(71) Applicants: SAMSUNG ELECTRONICS CO., LTD., Suwon-si (KR); SAMSUNG SDI CO., LTD., Yongin-si (KR)

(72) Inventors: A Ra Jo, Euiwang-si (KR); Chanjae Ahn, Suwon-si (KR); Sungwon Choi, Hwaseong-si (KR); Won Suk Chang, Hwaseong-si (KR); Boreum Jeong, Daejeon (KR)

(73) Assignees: SAMSUNG ELECTRONICS CO., LTD., Gyeonggi-Do (KR); SAMSUNG SDI CO., LTD., Gyeonggi-Do (KR)

( * ) Notice: Subject to any disclaimer, the term of this patent is extended or adjusted under 35 U.S.C. 154(b) by 310 days.

(21) Appl. No.: 17/246,926

(22) Filed: May 3, 2021

(65) Prior Publication Data
US 2021/0253796 A1    Aug. 19, 2021

Related U.S. Application Data

(62) Division of application No. 16/126,250, filed on Sep. 10, 2018, now Pat. No. 11,028,227.

(30) Foreign Application Priority Data

Sep. 8, 2017 (KR) .................. 10-2017-0115218

(51) Int. Cl.
| | | |
|---|---|---|
| C08G 73/14 | (2006.01) | |
| C08J 5/18 | (2006.01) | |
| B29C 41/00 | (2006.01) | |
| B29C 41/46 | (2006.01) | |
| C08G 73/10 | (2006.01) | |
| B29L 7/00 | (2006.01) | |
| B29K 79/00 | (2006.01) | |

(52) U.S. Cl.
CPC ............ *C08G 73/14* (2013.01); *B29C 41/003* (2013.01); *B29C 41/46* (2013.01); *C08G 73/1039* (2013.01); *C08G 73/1042* (2013.01); *C08J 5/18* (2013.01); *B29K 2079/08* (2013.01); *B29L 2007/008* (2013.01); *C08J 2379/08* (2013.01)

(58) Field of Classification Search
CPC ...... C08L 79/08; C08J 2379/08; C08G 73/14; C08G 73/1042; C08G 73/10
See application file for complete search history.

(56) References Cited

U.S. PATENT DOCUMENTS

| | | |
|---|---|---|
| 3,661,852 A | 5/1972 | Flowers et al. |
| 3,959,233 A | 5/1976 | Hanson et al. |
| 4,323,493 A | 4/1982 | Keske et al. |
| 4,607,073 A | 8/1986 | Sakashita et al. |
| 5,587,452 A | 12/1996 | Koning et al. |
| 5,821,319 A | 10/1998 | Shibuya et al. |
| 8,222,365 B2 | 7/2012 | Shimeno et al. |
| 9,018,343 B2 | 4/2015 | Park et al. |
| 9,200,117 B2 | 12/2015 | Cho et al. |
| 9,353,224 B2 | 5/2016 | Cho et al. |

(Continued)

FOREIGN PATENT DOCUMENTS

| | | |
|---|---|---|
| CN | 102532545 A | 7/2012 |
| CN | 102585223 A | 7/2012 |

(Continued)

OTHER PUBLICATIONS

English Translation of Office Action dated Jul. 27, 2022, in the corresponding Chinese Patent Application No. 201811042395.6, 11 pp.

(Continued)

*Primary Examiner* — Gregory Listvoyb
(74) *Attorney, Agent, or Firm* — CANTOR COLBURN LLP

(57) ABSTRACT

A poly(amide-imide) copolymer that is a reaction product of a substituted or unsubstituted linear aliphatic diamine including two terminals, a diamine represented by Chemical Formula 1, a dicarbonyl compound represented by Chemical Formula 2, and a tetracarboxylic acid dianhydride represented by Chemical Formula 3:

$$NH_2\text{-A-}NH_2 \qquad \text{Chemical Formula 1}$$

Chemical Formula 2

$$X \underset{\|}{\overset{O}{\text{—}}} R^3 \underset{\|}{\overset{O}{\text{—}}} X$$

Chemical Formula 3

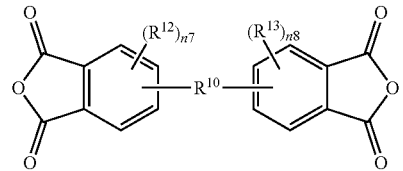

wherein, in Chemical Formulae 1 to 3, A, $R^3$, $R^{10}$, $R^{12}$, $R^{13}$, X, n7 and n8 are the same as defined in the specification.

17 Claims, No Drawings

(56) References Cited

U.S. PATENT DOCUMENTS

| | | |
|---|---|---|
| 9,422,429 B2 | 8/2016 | Hoffmann et al. |
| 9,580,555 B2 | 2/2017 | Ju et al. |
| 9,796,816 B2 | 10/2017 | Cho et al. |
| 10,100,153 B2 | 10/2018 | Jee et al. |
| RE48,141 E | 8/2020 | Ju et al. |
| 2012/0283407 A1 | 11/2012 | Hoppin et al. |
| 2016/0222210 A1 | 8/2016 | Hoffman et al. |
| 2016/0319076 A1 | 8/2016 | Hoffman et al. |
| 2017/0121460 A1 | 5/2017 | Hong et al. |
| 2019/0315925 A1 | 10/2019 | Choi et al. |
| 2020/0223983 A1 | 7/2020 | Hong et al. |

FOREIGN PATENT DOCUMENTS

| | | | |
|---|---|---|---|
| CN | 104411744 | * | 3/2015 |
| CN | 105899581 A | | 8/2016 |
| CN | 106957427 A | | 7/2017 |
| CN | 106977718 A | | 7/2017 |
| EP | 0315025 A1 | | 10/1988 |
| EP | 00315025 A1 | | 5/1989 |
| JP | 57182323 A | | 11/1982 |
| JP | 01193322 A | | 8/1989 |
| JP | 08-048775 A | | 2/1996 |
| JP | 200894946 A | | 4/2008 |
| JP | 2017125180 A | | 7/2017 |
| JP | 2018119141 A | | 8/2018 |
| JP | 2020510126 A | | 4/2020 |
| KR | 10-0171699 B1 | | 11/1996 |
| KR | 10-1229722 B1 | | 1/2013 |
| KR | 10-0035691 A | | 4/2013 |
| KR | 1020150024110 A | | 3/2015 |
| KR | 10-1519937 B1 | | 5/2015 |
| KR | 10-1523730 B1 | | 5/2015 |
| KR | 10-2017-0043447 A | | 4/2017 |
| KR | 1020170043447 A | | 4/2017 |
| KR | 1020170051358 A | | 5/2017 |
| WO | 2019004802 A1 | | 1/2019 |

OTHER PUBLICATIONS

Office Action dated Jul. 27, 2022, in the corresponding Chinese Patent Application No. 201811042395.6, 9 pp.

English translation of Japanese Office Action dated Apr. 26, 2022, issued in corresponding JP Application No. 2018-168899, 2 pp.

Japanese Office Action dated Apr. 26, 2022, issued in corresponding JP Application No. 2018-168899, 2 pp.

English Translation of Office Action dated Oct. 29, 2021 of the corresponding Korean Patent Application No. 10-2017-0115218, 11 pp.

Office Action dated Oct. 29, 2021 of the corresponding Korean Patent Application No. 10-2017-0115218, 7 pp.

H. Tagle, et al., "Synthesis and characterization of poly(amide-imides) from 3,4-dicarboxy-4'-chloroformylbiphenyl anhydride", Polymer, 1982, vol. 23, July, 1057.

Mi Hie Yi, et al., "Synthesis and characterization of poly(amideimide)s containing aliphatic diamine moieties", Di Angewandte Makromolekulare Chemie 233 (1995) 89-101.

* cited by examiner

POLY(AMIDE-IMIDE) COPOLYMER, COMPOSITION FOR PREPARING POLY(AMIDE-IMIDE) COPOLYMER, ARTICLE INCLUDING POLY(AMIDE-IMIDE) COPOLYMER, AND DISPLAY DEVICE INCLUDING THE ARTICLE

CROSS-REFERENCE TO RELATED APPLICATION

This is a divisional application that claims priority to U.S. application Ser. No. 16/126,250 filed Sep. 10, 2018, now U.S. Pat. No. 11,028,227, which in turn claims priority to Korean Patent Application No. 10-2017-0115218 filed in the Korean Intellectual Property Office on Sep. 8, 2017, and all the benefits accruing therefrom under 35 U.S.C. §§ 119; 120, the contents of which in their entirety are incorporated herein by reference.

BACKGROUND

1. Field

This disclosure relates to a poly(amide-imide) copolymer, a composition for preparing a poly(amide-imide) copolymer, an article including a poly(amide-imide) copolymer, and to a display device including the article.

2. Description of the Related Art

A flexible display, which is not restricted by time and place, that is thin and flexible like paper, ultra light, and consumes a small amount of electricity, has been increasingly in demand as a display for visualizing various information and delivering it to the users. The flexible display may be realized by using a flexible substrate, organic and inorganic materials for a low temperature process, flexible electronics, encapsulation, packaging, and the like.

A transparent plastic film for replacing a conventional window cover glass to be used in a flexible display must have high toughness and excellent optical properties. Desired optical properties include high light transmittance, low haze, low yellowness index, low YI difference after exposure to UV light, and the like.

There still remains a need for polymers having excellent optical and mechanical properties that could be used in transparent plastic films.

SUMMARY

An embodiment provides a poly(amide-imide) copolymer having improved optical and mechanical properties.

Another embodiment provides a composition for preparing a poly(amide-imide) copolymer.

Still another embodiment provides an article including a poly(amide-imide) copolymer.

Yet another embodiment provides a display device including an article including the poly(amide-imide) copolymer.

According to an embodiment, provided is a poly(amide-imide) copolymer that is a reaction product of a substituted or unsubstituted linear aliphatic diamine including two terminals, a diamine represented by Chemical Formula 1, a dicarbonyl compound represented by Chemical Formula 2, and a tetracarboxylic acid dianhydride represented by Chemical Formula 3:

$$NH_2\text{-A-}NH_2 \qquad \text{Chemical Formula 1}$$

wherein in Chemical Formula 1,

A is a ring system including two or more C6 to C30 aromatic rings linked by a single bond, wherein each of the two or more of the aromatic rings is independently unsubstituted or substituted by an electron-withdrawing group;

Chemical Formula 2

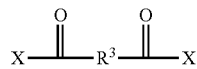

wherein, in Chemical Formula 2,
$R^3$ is a substituted or unsubstituted phenylene or a substituted or unsubstituted biphenylene group, and each X is an identical or a different halogen atom, Chemical Formula 3

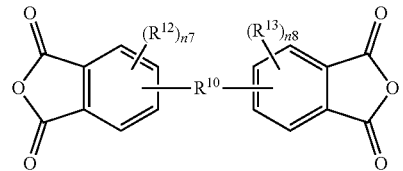

wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, n7 and n8 are each independently an integer ranging from 0 to 3.

The substituted or unsubstituted linear aliphatic diamine includes an amino group located at each end of the two terminals thereof, and may be a substituted or unsubstituted C1 to C30 saturated or unsaturated linear aliphatic diamine.

The substituted or unsubstituted linear aliphatic diamine includes an amino group located at each end of the two terminals thereof, and may be a substituted or unsubstituted C1 to C20 saturated linear aliphatic diamine.

The substituted or unsubstituted linear aliphatic diamine may be selected from methylene diamine, ethylene diamine, 1,3-propane diamine, 1,4-tetramethylene diamine, 1,5-pentamethylene diamine, 1,6-hexamethylene diamine, 1,7-heptamethylene diamine, 1,8-octamethylene diamine, 1,9-nanomethylene diamine, 1,10-decamehtylene diamine, 1,11-undecamethylene diamine, 1,12-dodecamethylene diamine, and a combination thereof.

The diamine represented by Chemical Formula 1 may have a ring system including two C6 to C12 aromatic rings linked by a single bond, wherein each of the two C6 to C12 aromatic rings may be substituted by an electron-withdrawing group selected from a halogen atom, a nitro group, a cyano group, a C1 or C2 haloalkyl group, a C2 to C6 alkanoyl group, and a C1 to C6 ester group.

The diamine represented by Chemical Formula 1 may include at least one selected from the diamines represented by chemical formulae:

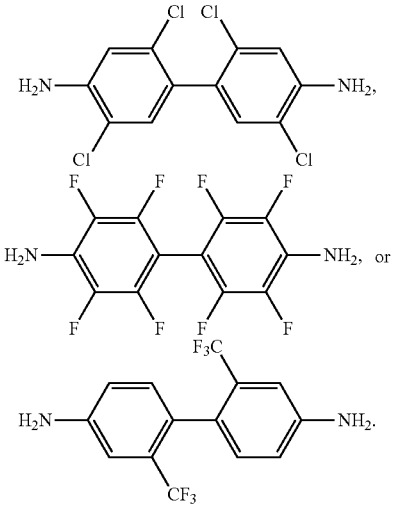

The diamine represented by Chemical Formula 1 may include the diamine represented by Chemical Formula A:

Chemical Formula A

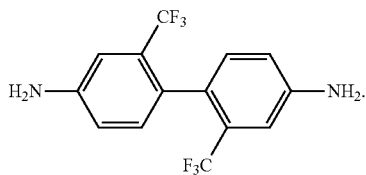

In Chemical Formula 2, $R^3$ may be a phenylene group, and each X may be independently Cl or Br.

The tetracarboxylic acid dianhydride represented by Chemical Formula 3 may include at least one selected from 3,3',4,4'-biphenyl tetracarboxylic dianhydride (BPDA), 3,3', 4,4'-diphenylsulfone tetracarboxylic dianhydride (DSDA), 4,4'-(hexafluoroisopropylidene)diphthalic anhydride (6FDA), and 4,4'-oxydiphthalic anhydride (ODPA).

The tetracarboxylic acid dianhydride represented by Chemical Formula 3 may include a combination of 3,3,4, 4-biphenyl tetracarboxylic dianhydride (BPDA) and 4,4'-(hexafluoroisopropylidene)diphthalic anhydride (6FDA).

An amount of the substituted or unsubstituted linear aliphatic diamine may be greater than 20 mole percent and less than 90 mole percent based on the total amount of the substituted or unsubstituted linear aliphatic diamine and the diamine represented by Chemical Formula 1.

A mole ratio of the dicarbonyl compound represented by Chemical Formula 2 and the tetracarboxylic acid dianhydride represented by Chemical Formula 3 may be 10 to 80:90 to 20.

According to an embodiment, provided is a composition for preparing a poly(amide-imide) copolymer including a substituted or unsubstituted linear aliphatic diamine, a compound represented by Chemical Formula 4, and a tetracarboxylic acid dianhydride represented by Chemical Formula 3:

Chemical Formula 4

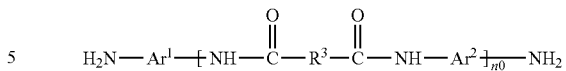

wherein, in Chemical Formula 4,
$R^3$ is a substituted or unsubstituted phenylene or a substituted or unsubstituted biphenylene group,
n0 is a number greater than or equal to 0,
$Ar^1$ and $Ar^2$ are each independently represented by Chemical Formula 5:

Chemical Formula 5

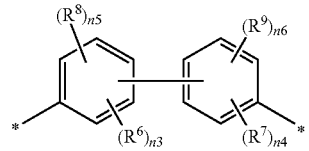

wherein, in Chemical Formula 5,
$R^6$ and $R^7$ are each independently an electron withdrawing group selected from —$CF_3$, —$CCl_3$, —$CBr_3$, —$Cl_3$, —$NO_2$, —CN, —C(=O)$CH_3$, and —$CO_2C_2H_5$,
$R^8$ and $R^9$ are each independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$ wherein $R^{205}$, $R^{206}$, and $R^{207}$ are each independently hydrogen or a C1 to C10 aliphatic organic group,
n3 is an integer ranging from 1 to 4, n5 is an integer ranging from 0 to 3, provided that n3+n5 is an integer ranging from 1 to 4, and
n4 is an integer ranging from 1 to 4, n6 is an integer ranging from 0 to 3, provided that n4+n6 is an integer ranging from 1 to 4;

Chemical Formula 3

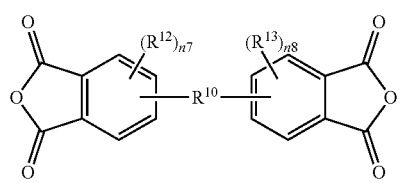

wherein, in Chemical Formula 3,
$R^{10}$ is a single bond, —O—, —S—, —C(=O)—, —CH (OH)—, —C(=O)NH—, —S(=O)$_2$—, —Si($CH_3$)$_2$—, —($CH_2$)$_p$—, —($CF_2$)$_q$—, —C($C_nH_{2n+1}$)$_2$—, —C($C_nF_{2n+1}$)$_2$—, —($CH_2$)$_p$C($C_nH_{2n+1}$)$_2$($CH_2$)$_q$—, or —($CH_2$)$_p$C($C_nF_{2n+1}$)$_2$($CH_2$)$_q$— wherein $1 \leq n \leq 10$, $1 \leq p \leq 10$, and $1 \leq q \leq 10$,
$R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —$OR^{201}$, wherein $R^{201}$ is a C1 to C10 aliphatic organic group, or a silyl group of formula —$SiR^{210}R^{211}R^{212}$, wherein $R^{210}$, $R^{211}$, and $R^{212}$ are each independently hydrogen or a C1 to C10 aliphatic organic group, and n7 and n8 are each independently an integer ranging from 0 to 3.

The composition may further include a diamine represented by Chemical Formula 1:

NH$_2$-A-NH$_2$     Chemical Formula 1 wherein in Chemical Formula 1,

A is a ring system including two or more C6 to C30 aromatic rings linked by a single bond, wherein each of the two or more aromatic rings is independently unsubstituted or substituted by an electron-withdrawing group.

The substituted or unsubstituted linear aliphatic diamine comprises two terminals, wherein the substituted or unsubstituted linear aliphatic diamine includes an amino group located at each end of the two terminals thereof, and wherein the substituted or unsubstituted linear aliphatic diamine may be a substituted or unsubstituted C1 to C30 saturated or unsaturated linear aliphatic diamine.

The substituted or unsubstituted linear aliphatic diamine includes an amino group located at each end of the two terminals thereof, and may be a substituted or unsubstituted C1 to C20 saturated linear aliphatic diamine.

The tetracarboxylic acid dianhydride represented by Chemical Formula 3 may be a combination of the compound represented by Chemical Formula 3-1 and the compound represented by Chemical Formula 3-2:

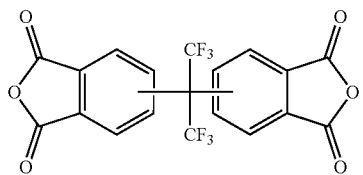

Chemical Formula 3-1

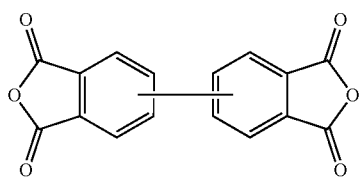

Chemical Formula 3-2

According to another embodiment, provided is an article including a poly(amide-imide) copolymer according to an embodiment.

The article may be a film, wherein the film may have a toughness of greater than or equal to 1,000 Joules×reverse cubic meters×10$^4$ (Joul·m$^{-3}$·10$^4$), and a refractive index of less than or equal to 1.68, when the film has a thickness of about 30 micrometers to about 100 micrometers.

According to another embodiment, provided is a display device including an article according to an embodiment.

Hereinafter, further embodiments will be described in detail.

DETAILED DESCRIPTION

This disclosure will be described more fully hereinafter. This disclosure may, however, be embodied in many different forms and is not to be construed as limited to the exemplary embodiments set forth herein.

It will be understood that when an element is referred to as being "on" another element, it may be directly on the other element or intervening elements may be present therebetween. In contrast, when an element is referred to as being "directly on" another element, there are no intervening elements present.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) as used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

"Mixture" as used herein is inclusive of all types of combinations, including blends, alloys, solutions, and the like.

As used herein, when a specific definition is not otherwise provided, the term "substituted" refers to a group or compound substituted with at least one substituent including a halogen (—F, —Br, —Cl, or —I), a hydroxy group, a nitro group, a cyano group, an amino group (—NH$_2$, —NH(R$^{100}$) or —N(R$^{101}$)(R$^{102}$), wherein R$^{100}$, R$^{101}$, and R$^{102}$ are the same or different, and are each independently a C1 to C10 alkyl group), an amidino group, a hydrazine group, a hydrazone group, a carboxyl group, an ester group, a ketone group, a substituted or unsubstituted alkyl group, a substituted or unsubstituted alicyclic organic group, a substituted or unsubstituted aryl group, a substituted or unsubstituted alkenyl group, a substituted or unsubstituted alkynyl group, a substituted or unsubstituted heteroaryl group, and a substituted or unsubstituted heterocyclic group, in place of at least one hydrogen of a functional group, or the substituents may be linked to each other to provide a ring.

As used herein, the term "alkyl group" refers to a straight or branched chain saturated aliphatic hydrocarbon group having the specified number of carbon atoms and having a valence of one. Non-limiting examples of the alkyl group are methyl, ethyl, and propyl.

As used herein, the term "alkoxy group" refers to "alkyl-O—", wherein the term "alkyl" has the same meaning as described above. Non-limiting examples of the alkoxy group are methoxy, ethoxy, and propoxy.

As used herein, when a definition is not otherwise provided, the term "alkanoyl" represents "alkyl-C(=O)—", wherein the term "alkyl" has the same meaning as described above.

As used herein, the term "aryl group", which is used alone or in combination, refers to an aromatic hydrocarbon group containing at least one ring. Non-limiting examples of the aryl group are phenyl, naphthyl, and tetrahydronaphthyl.

As used herein, the term "alkylene" indicates a straight or branched saturated aliphatic hydrocarbon group having a valence of at least two, optionally substituted with one or more substituents where indicated, provided that the valence of the alkylene group is not exceeded.

As used herein, the term "cycloalkylene" indicates a saturated cyclic hydrocarbon group having a valence of at least two, optionally substituted with one or more substituents where indicated, provided that the valence of the cycloalkylene group is not exceeded.

As used herein, when a definition is not otherwise provided, the term "arylene" indicates a divalent or higher valent group formed by the removal of two or more hydrogen atoms from one or more rings of an arene, wherein the hydrogen atoms may be removed from the same or different rings of the arene.

As used herein, when a specific definition is not otherwise provided, the term "alkyl group" refers to a C1 to C30 alkyl group, for example, a C1 to C15 alkyl group, the term "cycloalkyl group" refers to a C3 to C30 cycloalkyl group, for example, a C3 to C18 cycloalkyl group, the term "alkoxy group" refer to a C1 to C30 alkoxy group, for example, a C1 to C18 alkoxy group, the term "ester group" refers to a C2 to C30 ester group, for example, a C2 to C18 ester group, the term "ketone group" refers to a C3 to C30 ketone group, for example, a C3 to C18 ketone group, the term "aryl group" refers to a C6 to C30 aryl group, for example, a C6 to C18 aryl group, the term "alkenyl group" refers to a C2 to C30 alkenyl group, for example, a C2 to C18 alkenyl group, the term "alkynyl group" refers to a C2 to C30 alkynyl group, for example, a C2 to C18 alkynyl group, the term "alkylene group" refers to a C1 to C30 alkylene group, for example, a C1 to C18 alkylene group, and the term "arylene group" refers to a C6 to C30 arylene group, for example, a C6 to C16 arylene group.

As used herein, when a specific definition is not otherwise provided, the term "aliphatic organic group" refers to a C1 to C30 alkyl group, a C2 to C30 alkenyl group, a C2 to C30 alkynyl group, a C1 to C30 alkylene group, a C2 to C30 alkenylene group, or a C2 to C30 alkynylene group, for example, a C1 to C15 alkyl group, a C2 to C15 alkenyl group, a C2 to C15 alkynyl group, a C1 to C15 alkylene group, a C2 to C15 alkenylene group, or a C2 to C15 alkynylene group, the term "alicyclic organic group" refers to a C3 to C30 cycloalkyl group, a C3 to C30 cycloalkenyl group, a C3 to C30 cycloalkynyl group, a C3 to C30 cycloalkylene group, a C3 to C30 cycloalkenylene group, or a C3 to C30 cycloalkynylene group, for example, a C3 to C15 cycloalkyl group, a C3 to C15 cycloalkenyl group, a C3 to C15 cycloalkynyl group, a C3 to C15 cycloalkylene group, a C3 to C15 cycloalkenylene group, or a C3 to C15 cycloalkynylene group.

As used herein when a definition is not otherwise provided, the term "aromatic organic group" refers to a C6 to C30 group including one aromatic ring, two or more aromatic rings fused together to provide a condensed ring system, or two or more moieties independently selected from the foregoing (a single aromatic ring or a condensed ring system) linked through a single bond or through a functional group selected from a fluorenylene group, —O—, —S—, —C(=O)—, —CH(OH)—, —S(=O)$_2$—, —Si(CH$_3$)$_2$—, —(CH$_2$)$_p$—, wherein $1 \leq p \leq 10$, —(CF$_2$)$_q$—, wherein $1 \leq q \leq 10$, —C(CH$_3$)$_2$—, —C(CF$_3$)$_2$—, and —C(=O)NH—, for example, through —S(=O)$_2$—, for example a C6 to C30 aryl group or a C6 to C30 arylene group, for example, a C6 to C16 aryl group or a C6 to C16 arylene group such as phenylene. An example of an aromatic organic group is a fluorenylene group.

As used herein, when a specific definition is not otherwise provided, the term "heterocyclic group" refers to a C2 to C30 heterocycloalkyl group, a C2 to C30 heterocycloalkylene group, a C2 to C30 heterocycloalkenyl group, a C2 to C30 heterocycloalkenylene group, a C2 to C30 heterocycloalkynyl group, a C2 to C30 heterocycloalkynylene group, a C2 to C30 heteroaryl group, or a C2 to C30 heteroarylene group including 1 to 3 heteroatoms selected from O, S, N, P, Si, and a combination thereof in one ring, for example, a C2 to C15 heterocycloalkyl group, a C2 to C15 heterocycloalkylene group, a C2 to C15 heterocycloalkenyl group, a C2 to C15 heterocycloalkenylene group, a C2 to C15 heterocycloalkynyl group, a C2 to C15 heterocycloalkynylene group, a C2 to C15 heteroaryl group, or a C2 to C15 heteroarylene group including 1 to 3 heteroatoms selected from O, S, N, P, Si, and a combination thereof, in one ring.

When a group containing a specified number of carbon atoms is substituted with any of the groups listed in the preceding paragraph, the number of carbon atoms in the resulting "substituted" group is defined as the sum of the carbon atoms contained in the original (unsubstituted) group and the carbon atoms (if any) contained in the substituent. For example, when the term "substituted C1 to C30 alkyl" refers to a C1 to C30 alkyl group substituted with C6 to C30 aryl group, the total number of carbon atoms in the resulting aryl substituted alkyl group is C7 to C60.

As used herein, when a definition is not otherwise provided, "combination" commonly refers to mixing or copolymerization.

As used herein, when a definition is not otherwise provided, "polyimide" may refer to not only "polyimide" itself which is an imidization product of a polyamic acid, but also "polyamic acid" or a combination of the "polyimide" itself and "polyamic acid". Further, the terms "polyimide" and "polyamic acid" may be understood as the same material.

In addition, in the specification, the mark "*" may refer to a point of attachment to another atom.

Research efforts towards converting mobile devices, such as, a mobile phone or a tablet personal computer, and the like, to light, flexible, and bendable devices are currently ongoing. In this regard, a flexible and transparent window film for a display device having high hardness for replacing a rigid glass placed on top of the mobile devices is desired.

To be used as a window film, good optical and mechanical properties are desired. Desired optical properties include high light transmittance, low yellowness index (YI), low YI difference after exposure to UV light, low haze, low refractive index (low reflection index), and the like. Mechanical properties, such as hardness, may be supplemented with a hard coating layer, but a base film having high toughness may ensure that a final film has high mechanical properties.

A polyimide or poly(amide-imide) copolymer has excellent mechanical, thermal, and optical properties, and thus, is widely used as a plastic substrate for a display device, such as an organic light emitting diode (OLED), liquid crystal display (LCD), and the like. In order to use polyimide or poly(amide-imide) film as a window film for a flexible display device, however, further improved mechanical and optical properties, such as, high hardness (or modulus), toughness, high light transmittance, low yellowness index, low refractive index, and the like, are desired. It is difficult, however, to improve both mechanical and optical properties of the film at the same time, as the two properties, especially, tensile modulus and yellowness index of a polyimide or poly(amide-imide) film are in a trade-off relationship with regard to each other.

Meanwhile, in an effort to improve mechanical properties of a poly(amide-imide) copolymer film, researchers prepared a poly(amide-imide) copolymer by increasing the amount of an amide structural unit, or by including a dianhydride having a more rigid structure. However, the tensile modulus of such poly(amide-imide) copolymer is barely improved, while optical properties, such as YI, are deteriorated. In addition, refractive index of a film prepared from the poly(amide-imide) copolymer may increase to boost reflection index, or the toughness of the film may reduce.

The inventors of the subject matter of the present application have studied to develop a poly(amide-imide) copolymer having good optical properties, as well as improved toughness, and a composition for preparing the poly(amide-imide). As a result, they have found a poly(amide-imide) copolymer prepared by copolymerizing an aromatic tetracarboxylic dianhydride, an aromatic diamine, and an aromatic dicarbonyl compound, as monomers conventionally used for preparing a poly(amide-imide), and an additional substituted or unsubstituted linear aliphatic diamine, exhibits greatly improved toughness, as well as excellent optical properties. Moreover, the prepared poly(amide-imide) has a reduced glass transition temperature ($T_g$) as the polymer backbone has increased flexibility and segmental motion derived from the linear aliphatic diamine, and thus, may be made to a film at a lower temperature. This may lead to the cost reduction of fabricating a film. Further, as $T_g$ becomes lower, the amount of solvent remained in a final article, such as, for example, a film, reduces.

Accordingly, an embodiment provides a poly(amide-imide) copolymer that is a reaction product of a substituted or unsubstituted linear aliphatic diamine, a diamine represented by Chemical Formula 1, a dicarbonyl compound represented by Chemical Formula 2, and a tetracarboxylic acid dianhydride represented by Chemical Formula 3:

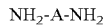
    NH$_2$-A-NH$_2$                         Chemical Formula 1 wherein in Chemical Formula 1,
A is a ring system including two or more C6 to C30 aromatic rings linked by a single bond, wherein each of the two or more aromatic rings is independently unsubstituted or substituted by an electron-withdrawing group,

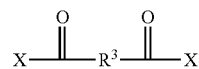

wherein, in Chemical Formula 2,
$R^3$ is a substituted or unsubstituted phenylene or a substituted or unsubstituted biphenylene group, and each X is an identical or a different halogen atom.

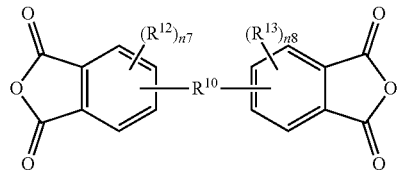

wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10, $R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —OR$^{201}$, wherein R$^{201}$ is a C1 to C10 aliphatic organic group, or a silyl group of formula —SiR$^{210}$R$^{211}$R$^{212}$, wherein R$^{210}$, R$^{211}$, and R$^{212}$ are each independently hydrogen or a C1 to C10 aliphatic organic group, n7 and n8 are each independently an integer ranging from 0 to 3.

The substituted or unsubstituted linear aliphatic diamine includes an amino group located at each end of the two terminals thereof, and may be a substituted or unsubstituted C1 to C30 saturated or unsaturated linear aliphatic diamine. For example, the substituted or unsubstituted linear aliphatic diamine includes an amino group located at each end of the two terminals thereof, and the linear aliphatic diamine may be a substituted or unsubstituted C1 to C30 saturated linear aliphatic diamine, or a substituted or unsubstituted C2 to C30 unsaturated linear aliphatic diamine having one or more carbon-carbon double bond or carbon-carbon triple bond.

When the substituted or unsubstituted linear aliphatic diamine is a substituted linear aliphatic diamine, the substitution indicates that one or more hydrogen bound to a carbon atom is substituted by another atom or a group selected from, for example, deuterium, a halogen, hydroxyl group, a cyano group, a nitro group, a haloalkyl group, a carboxyl group, an epoxy group, a glicydoxypropyl group, and the like, but is not limited thereto, and may be substituted by any atom or group that does not adversely affect the optical or mechanical properties of the poly(amide-imide) copolymer prepared therefrom.

In an exemplary embodiment, the substituted or unsubstituted linear aliphatic diamine includes an amino group located at each end of the two terminals thereof, and may be an unsubstituted C1 to C30 saturated linear aliphatic diamine, for example, an unsubstituted C1 to C20 saturated linear aliphatic diamine, for example, an unsubstituted C1 to C16 saturated linear aliphatic diamine, for example, and an unsubstituted C1 to C12 saturated linear aliphatic diamine, and for example, may be selected from methylene diamine, ethylene diamine, 1,3-propane diamine, 1,4-tetramethylene diamine, 1,5-pentamethylene diamine, 1,6-hexamethylene diamine, 1,7-heptamethylene diamine, 1,8-octamethylene diamine, 1,9-nanomethylene diamine, 1,10-decamehtylene diamine, 1,11-undecamethylene diamine, 1,12-dodecamethylene diamine, or a combination thereof, but is not limited thereto.

Meanwhile, although the linear aliphatic diamines exemplified above are those having a straight chain, the linear aliphatic diamine is not limited thereto, but may also include those linear but having a branch from a carbon atom in the straight chain.

The diamine represented by Chemical Formula 1 may have a ring system including two C6 to C12 aromatic rings linked by a single bond, wherein each of the two C6 to C12 aromatic rings may independently be substituted by an electron-withdrawing group selected from an halogen atom, a nitro group, a cyano group, a C1 or C2 haloalkyl group, a C2 to C6 alkanoyl group, or a C1 to C6 ester group.

In an exemplary embodiment, the electron-withdrawing group substituted to each of the aromatic rings of the diamine represented by Chemical Formula 1 may be selected from an halogen atom, —$CF_3$, —$CCl_3$, —$CBr_3$, or —$C_3$.

The diamine represented by Chemical Formula 1 may include at least one selected from the diamines represented by the following chemical formulae:

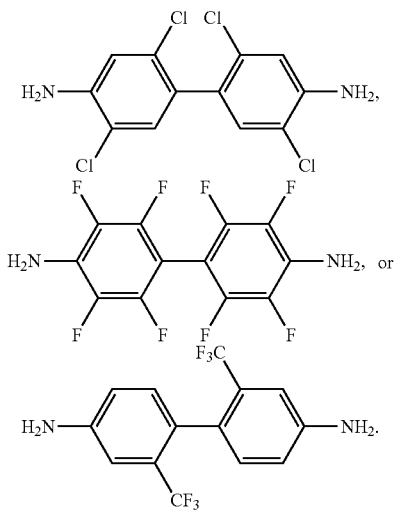

The diamine represented by Chemical Formula 1 may include a diamine represented by Chemical Formula A, i.e., 2,2'-bis(trifluoromethyl)benzidine (TFDB):

Chemical Formula A

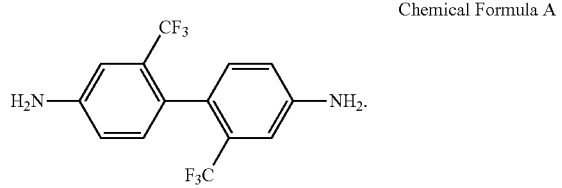 [SMILES: Nc1ccc(-c2ccc(N)cc2C(F)(F)F)c(C(F)(F)F)c1]

In Chemical Formula 2, $R^3$ may be a phenylene group, and each X may be independently Cl or Br.

In an exemplary embodiment, the dicarbonyl compound represented by Chemical Formula 3 may be terephthaloyl dichloride (TPCI).

The tetracarboxylic acid dianhydride represented by Chemical Formula 3 may include at least one selected from 3,3',4,4'-biphenyl tetracarboxylic dianhydride (BPDA), 3,3',4,4'-diphenylsulfone tetracarboxylic dianhydride (DSDA), 4,4'-(hexafluoroisopropylidene)diphthalic anhydride (6FDA), and 4,4'-oxydiphthalic anhydride (ODPA), and is not limited thereto.

In an exemplary embodiment, the tetracarboxylic acid dianhydride represented by Chemical Formula 3 may be a combination of the compound represented by Chemical Formula 3 wherein $R^{10}$ is a single bond, and both n7 and n8 are 0, that is, for example, 3,3',4,4'-biphenyl tetracarboxylic dianhydride (BPDA), and the compound represented by Chemical Formula 3 wherein $R^{10}$ is —$C(C_nF_{2n+1})_2$— wherein $1 \leq n \leq 10$, and both n7 and n8 are 0, that is, for example, 4,4'-(hexafluoroisopropylidene)diphthalic anhydride (6FDA).

At least one of the substituted or unsubstituted linear aliphatic diamine and the diamine represented by Chemical Formula 1 may react with a dicarbonyl compound represented by Chemical Formula 2 to provide an amide structural unit in a poly(amide-imide) copolymer, and at least one of the substituted or unsubstituted linear aliphatic diamine and the diamine represented by Chemical Formula 1 may react with a tetracarboxylic acid dianhydride represented by Chemical Formula 3 to provide an imide structural unit in a poly(amide-imide) copolymer.

A conventional method for preparing a poly(amide-imide) copolymer may include preparing an amide structural unit by reacting a dicarbonyl compound represented by Chemical Formula 2, such as, for example, a dicarbonyl chloride, with a diamine, such as, for example, at least one of the substituted or unsubstituted linear aliphatic diamine and the diamine represented by Chemical Formula 1, to prepare an amide structural unit, and further adding and reacting an additional diamine, such as, for example, at least one of the substituted or unsubstituted linear aliphatic diamine and the diamine represented by Chemical Formula 1, with a tetracarboxylic acid dianhydride, for example, a tetracarboxylic acid dianhydride represented by Chemical Formula 3, to prepare an amic acid structural unit, as well as to link the prepared amide structural unit and the amic acid structural unit to provide a poly(amide-amic acid) copolymer. Thus prepared poly(amide-amic acid) copolymer may be partially or completely imidized by chemical and/or thermal imidization reaction. Then, the obtained poly(amide-amic acid and/or imide) copolymer may be precipitated, filtered, and/or further heat-treated to provide a final poly(amide-imide) copolymer. This method is well known to persons skilled in the art to which the present inventive concept pertains.

An amide structural unit prepared by reacting a substituted or unsubstituted linear aliphatic diamine, for example, an unsubstituted linear aliphatic saturated diamine, and a dicarbonyl compound represented by Chemical Formula 2 may be represented by Chemical Formula 7, and an amide structural unit prepared by reacting a diamine represented by Chemical Formula 1 and a dicarbonyl compound represented by Chemical Formula 2 may be represented by Chemical Formula 8:

Chemical Formula 7

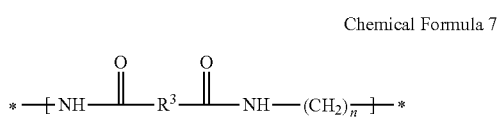

wherein in Chemical Formula 7,
R³ is the same as defined for Chemical Formula 3, and
n is an integer of greater than or equal to 1, for example, an integer ranging from 1 to 30.

Chemical Formula 8

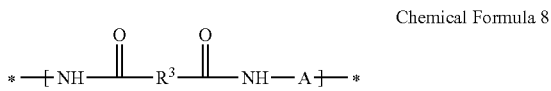

wherein in Chemical Formula 8,
R³ is the same as defined for Chemical Formula 3, and A is the same as defined for Chemical Formula 1.

Meanwhile, an imide structural unit prepared by reacting a substituted or unsubstituted linear aliphatic diamine, for example, an unsubstituted linear aliphatic saturated diamine, and a tetracarboxylic acid dianhydride represented by Chemical Formula 3 may be represented by Chemical Formula 9, and an imide structural unit prepared by reacting a diamine represented by Chemical Formula 1 and a tetracarboxylic acid dianhydride represented by Chemical Formula 3 may be represented by Chemical Formula 10:

Chemical Formula 9

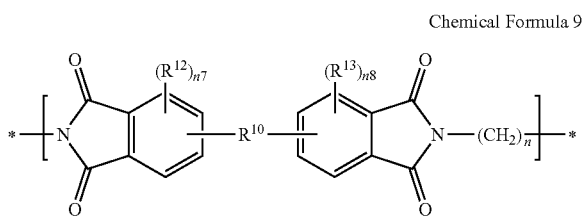

wherein in Chemical Formula 9,
each of $R^{10}$, $R^{12}$, $R^{13}$, n7 and n8 are the same as defined for Chemical Formula 3, and
n is an integer of greater than or equal to 1, for example, an integer ranging from 1 to 30;

Chemical Formula 10

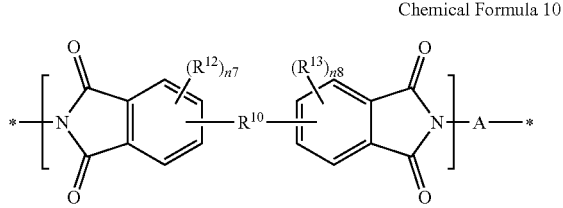

wherein in Chemical Formula 10,
A is the same as defined for Chemical Formula 1, and $R^{10}$, $R^{12}$, $R^{13}$, n7 and n8 are the same as defined for Chemical Formula 3.

Therefore, a poly(amide-imide) copolymer according to an embodiment may include an amide structural unit represented by at least one of Chemical Formula 7 and Chemical Formula 8, and an imide structural unit represented by at least one of Chemical Formula 9 and Chemical Formula 10, provided that the poly(amide-imide) copolymer is not consisting of an amide structural unit represented by Chemical Formula 7 and an imide structural unit represented by Chemical Formula 9, or of an amide structural unit represented by Chemical Formula 8 and an imide structural unit represented by Chemical Formula 10.

The substituted or unsubstituted linear aliphatic diamine may be included in an amount of less than 90 mole percent (mole %), for example, greater than 20 mole % and less than 90 mole %, for example, greater than or equal to about 25 mole % and less than or equal to about 85 mole %, and for example, greater than or equal to about 30 mole % and less than or equal to about 80 mole %, based on the total amount of the substituted or unsubstituted linear aliphatic diamine and the diamine represented by Chemical Formula 1.

By including the substituted or unsubstituted linear aliphatic diamine, along with the diamine represented by Chemical Formula 1, in the above range, and reacting them with a dicarbonyl compound represented by Chemical Formula 2 and a tetracarboxylic acid dianhydride represented by Chemical Formula 3, thus prepared poly(amide-imide) copolymer may have good mechanical properties, such as, for example, a toughness of greater than or equal to about 1,000 Joul·m$^{-3}$·10$^4$, a low $T_g$, such as, for example, less than 270° C., as well as excellent optical properties.

If the amount of the substituted or unsubstituted linear aliphatic diamine is less than or equal to 20 mole % based on the total amount of the diamines, improvement in toughness may be hardly expected, while if the amount is greater than or equal to 90 mole % based on the total amount of the diamines, the tensile modulus may substantially be deteriorated.

The dicarbonyl compound represented by Chemical Formula 2 and the tetracarboxylic acid dianhydride represented by Chemical Formula 3 may be included in a mole ratio of 10 to 80:90 to 20, for example, 10 to 70:90 to 30, for example, 10 to 60:90 to 40, for example, 10 to 50:90 to 50, for example, 10 to 40:90 to 60, and for example, 10 to 30:90 to 70.

By including the dicarbonyl compound represented by Chemical Formula 2 and tetracarboxylic acid dianhydride represented by Chemical Formula 3 at a mole ratio of the above, the prepared poly(amide-imide) copolymer may have improved mechanical properties, such as, for example, an improved toughness, while maintaining excellent optical properties, such as, for example, a high transmittance, a low Yellowness Index (YI), a small color change after exposing to Ultra Violet (UV) light, a low haze, and the like. For example, the poly(amide-imide) copolymer according to an embodiment may have a transmittance of about greater than or equal to about 89% at a wavelength range of 350 nanometers to 750 nanometers, YI of less than 2.0, less than 1.1 of YI increase after exposure to an ultraviolet (UV) lamp of a UVB wavelength region for 72 hours, and a toughness of greater than or equal to 1,000 Joul·m$^{-3}$·10$^4$. Further, the poly(amide-imide) copolymer may have a low $T_g$ of less than 270° C.

The tetracarboxylic acid dianhydride represented by Chemical Formula 3 may be a combination of the compound represented by Chemical Formula 3 wherein $R^{10}$ is a single bond, and both n7 and n8 are 0, and the compound represented by Chemical Formula 3 wherein $R^{10}$ is —C(C$_n$F$_{2n+1}$)$_2$— wherein 1≤n≤10, and both n7 and n8 are 0, in a mole ratio of 1:5 to 10, for example, 1:5 to 9, and for example, 1:6 to 8. In an exemplary embodiment, the tetracarboxylic acid dianhydride represented by Chemical Formula 3 may be a combination of 3,3',4,4'-biphenyl tetracarboxylic dianhydride (BPDA) and 4,4'-(hexafluoroisopropylidene)diphthalic anhydride (6FDA), and in this case, by including BPDA and 6FDA in the above ratio, the prepared poly(amide-imide) copolymer may have good optical properties, as well as improved mechanical properties.

When $R^{10}$ is a single bond in the tetracarboxylic acid dianhydride represented by Chemical Formula 3, the tetracarboxylic acid dianhydride has much more rigid structure than those having different groups as said $R^{10}$. It has been known that as the amount of the tetracarboxylic acid dianhydride having rigid structure increases, mechanical properties of the prepared poly(amide-imide) copolymer increases. However, although the poly(amide-imide) copolymer according to an embodiment is prepared from a reactant wherein the amount of the tetracarboxylic acid dianhydride represented by Chemical Formula 3 having $R^{10}$ which is not a single bond is greater than that having $R^{10}$ which is a single bond, the poly(amide-imide) copolymer has improved mechanical properties, such as, for example, a high toughness of greater than or equal to about 1,000 Joul·m$^{-3}$·10$^4$, while maintaining good optical properties, such as, for example, a high light transmittance, for example, greater than or equal to about 89% in a wavelength range of 350 nm to 750 nm, and a YI of less than or equal to 2.0. Without being bound to a specific theory, it is understood that these results may derive from the improved flexibility of the poly(amide-imide) copolymer according to an embodiment prepared by polymerizing a composition including a substituted or unsubstituted linear aliphatic diamine.

Accordingly, the poly(amide-imide) copolymer according to an embodiment having excellent optical and mechanical properties may be advantageous for a use in a display device, such as, for example, as a window film for a flexible display device.

Another embodiment provides a composition for preparing a poly(amide-imide) copolymer including a substituted or unsubstituted linear aliphatic diamine, a compound represented by Chemical Formula 4, and a tetracarboxylic acid dianhydride represented by Chemical Formula 3:

Chemical Formula 4

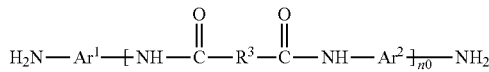

wherein, in Chemical Formula 4,
$R^3$ is a substituted or unsubstituted phenylene or a substituted or unsubstituted biphenylene group,
n0 is a number greater than or equal to 0,
$Ar^1$ and $Ar^2$ are each independently represented by Chemical Formula 5:

Chemical Formula 5

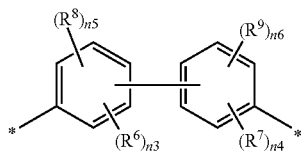

wherein, in Chemical Formula 5,
$R^6$ and $R^7$ are each independently an electron withdrawing group selected from —CF$_3$, —CCl$_3$, —CBr$_3$, —Cl$_3$, —NO$_2$, —CN, —C(=O)CH$_3$, and —CO$_2$C$_2$H$_5$,
$R^8$ and $R^9$ are each independently a halogen, a hydroxy group, a substituted or unsubstituted C1 to C10 aliphatic organic group, a substituted or unsubstituted C6 to C20 aromatic organic group, an alkoxy group of formula —OR$^{204}$, wherein $R^{204}$ is a C1 to C10 aliphatic organic group, or a silyl group of formula —SiR$^{205}$R$^{206}$R$^{207}$ wherein $R^{205}$, $R^{206}$, and $R^{207}$ are each independently hydrogen or a C1 to C10 aliphatic organic group,
n3 is an integer ranging from 1 to 4, n5 is an integer ranging from 0 to 3, provided that n3+n5 is an integer ranging from 1 to 4, and
n4 is an integer ranging from 1 to 4, n6 is an integer ranging from 0 to 3, provided that n4+n6 is an integer ranging from 1 to 4;

Chemical Formula 3

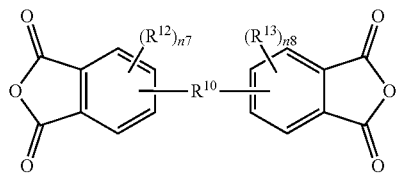

wherein, in Chemical Formula 3,
$R^{10}$ is a single bond, —O—, —S—, —C(=O)—, —CH(OH)—, —C(=O)NH—, —S(=O)$_2$—, —Si(CH$_3$)$_2$—, —(CH$_2$)$_p$—, —(CF$_2$)$_q$—, —C(C$_n$H$_{2n+1}$)$_2$—, —C(C$_n$F$_{2n+1}$)$_2$—, —(CH$_2$)$_p$C(C$_n$H$_{2n+1}$)$_2$(CH$_2$)$_q$—, or —(CH$_2$)$_p$C(C$_n$F$_{2n+1}$)$_2$(CH$_2$)$_q$— wherein 1≤n≤10, 1≤p≤10, and 1≤q≤10,
$R^{12}$ and $R^{13}$ are each independently a halogen, a hydroxy group, a substituted or unsubstituted C1 to C10 aliphatic organic group, a substituted or unsubstituted C6 to C20 aromatic organic group, an alkoxy group of formula —OR$^{201}$, wherein $R^{201}$ is a C1 to C10 aliphatic organic group, or a silyl group of formula —SiR$^{210}$R$^{211}$R$^{212}$, wherein $R^{210}$, $R^{211}$, and $R^{212}$ are each independently hydrogen or a C1 to C10 aliphatic organic group, and
n7 and n8 are each independently an integer ranging from 0 to 3.

$R^3$ of Chemical Formula 3 may be an unsubstituted phenylene group, both $R^6$ and $R^7$ may be —CF$_3$, both n3 and n4 may be 1, and both n5 and n6 may be 0 (zero).

As described above, in a conventional method for preparing a poly(amide-imide) copolymer, an amide structural unit may first be prepared by a reaction of a dicarbonyl compound and a diamine, and then an additional diamine and a dianhydride compound are added to the reactor to prepare an amic acid structural unit, as well as a poly(amide-imide) copolymer by linking the amide structural unit and the amic acid structural unit. Meanwhile, in the process of preparing the amide structural unit, there is a problem that a by-product, such as, halogenated hydrogen (HX: 'H' indicates hydrogen, and 'X' indicates halogen), for example, hydrogen chloride (HCl), is produced. The hydrogen chloride by-product causes corrosion of an element of an apparatus, and thus, should necessarily be removed by a precipitation process. In order to remove the by-product, an HX scavenger, such as a tertiary amine, may be added to the reactor, whereby a salt of HX is produced (please see Reaction Scheme 1 below). If the produced salt of HX is not removed and a film is produced therefrom, serious deterioration of optical properties of the produced film occurs. Therefore, a precipitation process to remove the salt of HX is required in the conventional method for preparing poly(amide-imide) copolymer. The precipitation process increases total process time and cost, while reducing the yield of the final poly(amide-imide) copolymer produced therefrom.

Reaction Scheme 1

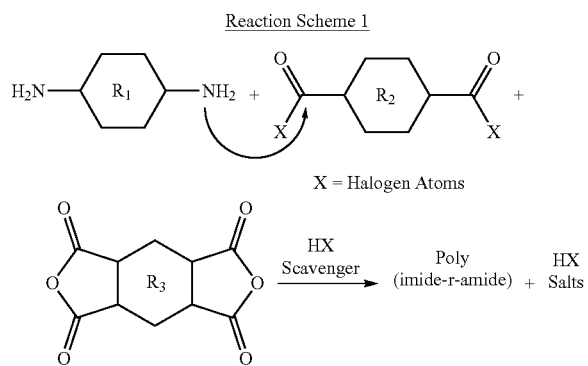

In addition to using the conventional method including the precipitation process as described above, it is also possible to prepare a poly(amide-imide) copolymer according to an embodiment by first reacting a diamine and a dicarbonyl compound to prepare an amide structural unit-containing oligomer having amino groups located at both ends thereof (hereinafter, referred to as "an amide structural unit-containing oligomer"), and then reacting the prepared amide structural unit-containing oligomer as a diamine monomer with a tetracarboxylic acid dianhydride to provide a poly(amide-imide) copolymer. According to the new method for preparing a poly(amide-imide) copolymer, the precipitation process for removing the HX salt may be omitted, and thus, not only the total process time and cost may be reduced, but also the yield of the final poly(amide-imide) copolymer may increase. Further, it is also possible to obtain a poly(amide-imide) copolymer including a higher amount of an amide structural unit than those prepared by using the conventional method, and thus, an article prepared from the poly(amide-imide) copolymer, for example, a film, may have further improved mechanical properties, while maintaining good optical properties.

Accordingly, another embodiment provides a composition for preparing a poly(amide-imide) copolymer including an amide structural unit-containing oligomer represented by Chemical Formula 4 as a diamine monomer, which may be prepared by reacting a diamine and a dicarbonyl compound, a tetracarboxylic acid dianhydride represented by Chemical Formula 3 for reacting with the oligomer to provide an imide structural unit, and as an additional diamine, a substituted or unsubstituted linear aliphatic diamine for reacting with the tetracarboxylic acid dianhydride represented by Chemical Formula 3 to provide an imide structural unit.

The compound represented by Chemical Formula 4 may be prepared by reacting a dicarbonyl compound represented by Chemical Formula 2 in which $R^3$ is a substituted or unsubstituted phenylene group or a substituted or unsubstituted biphenylene group, and one or two diamine(s) represented by Chemical Formula 1 in which A is represented by Chemical Formula 5, wherein the diamine represented by Chemical Formula 1 may be added in a greater amount than the dicarbonyl compound represented by Chemical Formula 2 to provide an oligomer having amino groups at both ends thereof. In this case, there may be a remaining diamine that does not react with the dicarbonyl compound, which may also be represented by Chemical Formula 4, wherein n0 is 0 (zero). Accordingly, the diamine represented by Chemical Formula 4 wherein n0 is 0 may also be reacted with a tetracarboxylic acid dianhydride represented by Chemical Formula 3 along with the compound represented by Chemical Formula 4 wherein n0 is greater than or equal to 1 to prepare an imide structural unit.

In an embodiment, the composition may further include a diamine represented by Chemical Formula 1:

wherein in Chemical Formula 1,

A is a ring system including two or more C6 to C30 aromatic rings linked by a single bond, wherein each of the two or more aromatic rings is independently unsubstituted or substituted by an electron-withdrawing group.

In an exemplary embodiment, the diamine represented by Chemical Formula 1 may have a ring system including two C6 to C12 aromatic rings linked by a single bond, wherein each of the two C6 to C12 aromatic rings may independently be substituted by an electron-withdrawing group selected from an halogen atom, a nitro group, a cyano group, a C1 or C2 haloalkyl group, a C2 to C6 alkanoyl group, or a C1 to C6 ester group.

In an exemplary embodiment, the diamine represented by Chemical Formula 1 may include at least one selected from the diamines represented by the following chemical formulae:

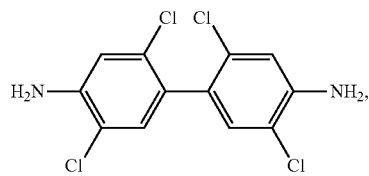

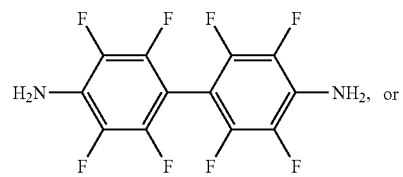

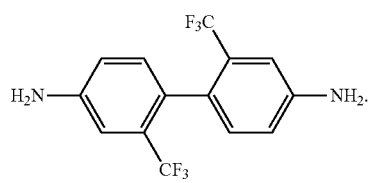

The diamine represented by Chemical Formula 1 may include a diamine represented by Chemical Formula A, i.e., 2,2'-bis(trifluoromethyl)benzidine (TFDB):

Chemical Formula A

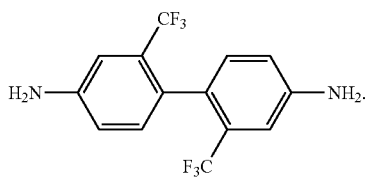

The tetracarboxylic acid dianhydride represented by Chemical Formula 3 may be a combination of the compound represented by Chemical Formula 3-1 and the compound represented by Chemical Formula 3-2, but is not limited thereto:

Chemical Formula 3-1

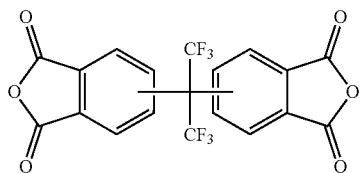

Chemical Formula 3-2

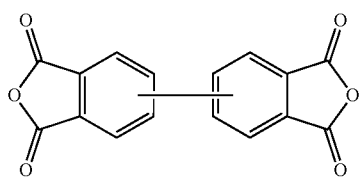

The compound represented by Chemical Formula 3-1 may be 6FDA, the compound represented by Chemical Formula 3-2 may be at least one of s-BPDA, a-BPDA, and i-BPDA, and in an exemplary embodiment, the compound represented by Chemical Formula 3-2 may be s-BPDA.

In an exemplary embodiment, an amount of the substituted or unsubstituted linear aliphatic diamine may be less than 90 mole %, for example, greater than 20 mole % and less than 90 mole %, for example, greater than or equal to about 25 mole % and less than or equal to about 85 mole %, and for example, greater than or equal to about 30 mole % and less than or equal to about 80 mole %, based on the total mole number of the substituted or unsubstituted linear aliphatic diamine and any other diamines required to prepare the poly(amide-imide) copolymer, which also include the diamine needed to prepare the compound represented by Chemical Formula 4.

Explanations for the substituted or unsubstituted linear aliphatic diamine, the diamine represented by Chemical Formula 1, the dicarbonyl compound represented by Chemical Formula 2, and the tetracarboxylic acid dianhydride represented by Chemical Formula 3 are the same as those described above for the poly(amide-imide) copolymer according to an embodiment, and thus, a more detailed explanation for the compounds are omitted here.

After preparing a poly(amide-imide) copolymer from the composition, an article may be formed from the poly(amide-imide) copolymer through a dry-wet method, a dry method, or a wet method, but is not limited thereto. When the article is a film, it may be manufactured using a solution including the composition through the dry-wet method, wherein a layer is formed by extruding the solution of the composition from a mouth piece on a supporter, such as drum or an endless belt, drying the layer by evaporating the solvent from the layer until the layer has a self-maintenance property. The drying may be performed by heating, for example, from about 25° C. to about 150° C., within about 1 hour or less. Then, the dried layer may be heated from the room temperature to about 250° C. or to about 300° C. at a heating rate of about 10° C. per minute, and then be allowed to stand at the heated temperature for about 5 minutes to about 30 minutes to obtain a polyimide-based film.

When the surface of the drum and/or the endless belt used for the drying process becomes flat, a layer with a flat surface is formed. The layer obtained after the drying process is delaminated from the supporter, and subjected to a wet process, desalted, and/or desolventized. The manufacturing of the film is completed after the layer is elongated, dried, and/or heat treated. The heat treatment may be performed at about 200° C. to about 500° C., for example, at about 250° C. to about 400° C., for several seconds to several minutes. After the heat treatment, the layer may be cooled slowly, for example, at a cooling rate of less than or equal to about 50° C. per minute.

The layer may be formed as a single layer or multiple layers.

When prepared as a film, the film may have a yellowness index (YI) of less than or equal to 2.1 at a thickness of about 35 micrometers (μm) to about 100 μm according to an ASTM D1925 method, and a light transmittance of greater than or equal to 89% in a wavelength range of 350 nm to 750 nm. Further, the yellowness difference (ΔYI) before and after exposure to UVB lamp (greater than or equal to 200 millijoules per square centimeter, mJ/cm$^2$) for 72 hours may be less than 1.1, for example, less than or equal to 0.95, and a refractive index may be less than or equal to 1.68, which prove very good optical properties. Further, toughness of the film may be greater than or equal to 1,000 Joulm$^{-3}$·10$^4$, which proves good mechanical properties.

That is, the article may maintain excellent optical properties of a poly(amide-imide) copolymer, such as, for example, a low YI and high light transmittance, while having an improved and high toughness, and thus, may be advantageous for a use as a window film for a flexible display device.

Hereafter, the technology of this disclosure is described in detail with reference to examples. The following examples and comparative examples are not restrictive but are illustrative only.

EXAMPLES

Synthesis Example 1: Preparation of an Oligomer Containing 70 Mole % of an Amide Structural Unit as a Diamine Monomer An amide structural unit-containing oligomer, as a diamine monomer, is prepared by reacting TPCI and 2,2'-bis(trifluoromethyl)benzidine (TFDB), in accordance with Reaction Scheme 2:

Reaction Scheme 2

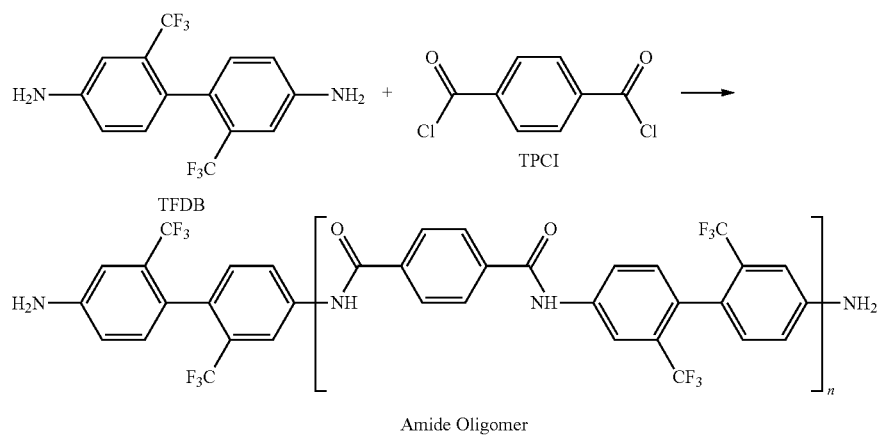

Amide Oligomer

That is, 1 mole equivalent (0.122 mole, 39.2 grams) of 2,2'-bis(trifluoromethyl)benzidine (TFDB) and 2.8 mole equivalent (0.343 mole, 27.11 grams) of pyridine are dissolved in 700 g of N,N-dimethyl acetamide (DMAc) as a solvent in a round-bottomed flask, and 50 milliliters (mL) of DMAc is further added to the flask to dissolve the remaining TFDB. Then, 0.7 mole equivalent (0.086 mole, 17.4 g) of terephthaloyl chloride (TPCI) is divided into 4 portions, which are individually added, each portion at a time, to be mixed with the TFDB solution. The mixture is then vigorously stirred and reacted for 15 minutes at room temperature.

The resultant solution is further stirred under a nitrogen atmosphere for 2 hours, and then added to 7 liters of water containing 350 g of NaCl. The resulting mixture is stirred for 10 minutes. Subsequently, a solid produced therein is filtered, re-suspended twice by using 5 liters (L) of deionized water, and then re-filtered. The water remaining in the final product on the filter is removed to the extent possible by thoroughly pressing the filtered precipitate on a filter. The precipitate is then dried at 90° C. under vacuum for 48 hours, to obtain an amide structural unit-containing oligomer represented in Reaction Scheme 2, as a diamine monomer, as a final product. The prepared oligomer containing 70 mol % of amide structural unit has a number average molecular weight of about 997 grams per mole (gram/mole).

Examples and Comparative Example: Preparation of Poly(Amide-Imide) Copolymer Films Example 1

168 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 17.327 grams of the 70 mol % of amide structural unit-containing oligomer prepared in Synthesis Example 1, 8.171 g of 2,2'-bis(trifluoromethyl)benzidine (TFDB), and 3.271 g of hexamethylene diamine (HMDA) are added thereto and dissolved, and the temperature is set to 25° C. Then, 3.231 grams of 3,3',4,4'-biphenyltetracarboxylic dianhydride (BPDA), and 24.336 grams of 4,4'-(hexafluoroisopropylidene)diphthalic anhydride (6FDA) are added thereto, and the mixture is stirred for 48 hours. Then, 5.20 grams of pyridine and 20.14 grams of acetic anhydride are added thereto, and the mixture is stirred for 24 hours to obtain a poly(amic acid-amide) copolymer solution, of which the solid content is 11.2 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a convention oven, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 2

136 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 7.642 grams of the 70 mol % of amide structural unit-containing oligomer prepared in Synthesis Example 1, 2.276 g of 2,2'-bis(trifluoromethyl)benzidine (TFDB), and 1.925 g of hexamethylene diamine (HMDA) are added thereto and dissolved, and the temperature is set to 25° C. Then, 1.425 grams of 3,3',4,4'-biphenyltetracarboxylic dianhydride (BPDA), and 10.733 grams of 4,4'-(hexafluoroisopropylidene)diphthalic anhydride (6FDA) are added thereto, and the mixture is stirred for 48 hours. Then, 2.29 grams of pyridine and 8.88 grams of acetic anhydride are added thereto, and the mixture is stirred for 24 hours to obtain a poly(amic acid-amide) copolymer solution, of which the solid content is 14 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a convention oven, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 3

136 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 7.921 grams of the 70 mol % of amide structural unit-containing oligomer prepared in Synthesis Example 1, 0.982 g of 2,2'-bis(trifluoromethyl)benzidine (TFDB), and 2.495 g of hexamethylene diamine (HMDA) are added thereto and dissolved, and the temperature is set to 25° C. Then, 1.477 grams of 3,3',4,4'-biphenyltetracarboxylic dianhydride (BPDA), and 11.125 grams of 4,4'-(hexafluoroisopropylidene)diphthalic anhydride (6FDA) are added thereto, and the mixture is stirred for 48 hours. Then, 2.38 grams of pyridine and 9.21 grams of acetic anhydride are added thereto, and the mixture is stirred for 24 hours to obtain a poly(amic acid-amide) copolymer solution, of which the solid content is 14 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a convention oven, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 4

152 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 20.203 grams of the 70 mol % of amide structural unit-containing oligomer prepared in Synthesis Example 1, and 6.293 g of hexamethylene diamine (HMDA) are added thereto and dissolved, and the temperature is set to 25° C. Then, 17.176 grams of 3,3',4,4'-biphenyltetracarboxylic dianhydride (BPDA), and 14.3 grams of 4,4'-(hexafluoroisopropylidene)diphthalic anhydride (6FDA) are added thereto, and the mixture is stirred for 48 hours. Then, 5.39 grams of pyridine and 20.86 grams of acetic anhydride are added thereto, and the mixture is stirred for 24 hours to obtain a poly(amic acid-amide) copolymer solution, of which the solid content is 11.2 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a convention oven, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 5

120 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 7.930 grams of the 70 mol % of amide structural unit-containing oligomer prepared in Synthesis Example 1, 4.735 g of 2,2'-bis(trifluoromethyl)benzidine (TFDB), and 4.007 g of hexamethylene diamine (HMDA) are added thereto and dissolved, and the temperature is set to 25° C. Then, 2.321 grams of 3,3',4,4'-biphenyltetracarboxylic dianhydride (BPDA), and 21.006 grams of 4,4'-(hexafluoroisopropylidene)diphthalic anhydride (6FDA) are added thereto, and the mixture is stirred for 48 hours. Then, 4.36 grams of pyridine and 16.90 grams of acetic anhydride are added thereto, and the mixture is stirred for 24 hours to obtain a poly(amic acid-amide) copolymer solution, of which the solid content is 22.1 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a convention oven, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 6

120 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 10.681 grams of the 70 mol % of amide structural unit-containing oligomer prepared in Synthesis Example 1, 0.427 g of 2,2'-bis(trifluoromethyl)benzidine (TFDB), and 5.383 g of hexamethylene diamine (HMDA) are added thereto and dissolved, and the temperature is set to 25° C. Then, 2.340 grams of 3,3',4,4'-biphenyltetracarboxylic dianhydride (BPDA), and 21.17 grams of 4,4'-(hexafluoroisopropylidene)diphthalic anhydride (6FDA) are added thereto, and the mixture is stirred for 48 hours. Then, 4.40 grams of pyridine and 17.03 grams of acetic anhydride are added thereto, and the mixture is stirred for 24 hours to obtain a poly(amic acid-amide) copolymer solution, of which the solid content is 22 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a convention oven, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 7

154 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 10.550 grams of the 70 mol % of amide structural unit-containing oligomer prepared in Synthesis Example 1, and 7.784 g of hexamethylene diamine (HMDA) are added thereto and dissolved, and the temperature is set to 25° C. Then, 2.737 grams of 3,3',4,4'-biphenyltetracarboxylic dianhydride (BPDA), and 28.929 grams of 4,4'-(hexafluoroisopropylidene)diphthalic anhydride (6FDA) are added thereto, and the mixture is stirred for 48 hours. Then, 2.35 grams of pyridine and 18.24 grams of acetic anhydride are added thereto, and the mixture is stirred for 24 hours to obtain a poly(amic acid-amide) copolymer solution, of which the solid content is 20.4 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a convention oven, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 8

120 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 5.982 grams of the 70 mol % of amide structural unit-containing oligomer prepared in Synthesis Example 1, 1.882 g of 2,2'-bis(trifluoromethyl)benzidine (TFDB), and 5.987 g of hexamethylene diamine (HMDA) are added thereto and dissolved, and the temperature is set to 25° C. Then, 2.602 grams of 3,3',4,4'-biphenyltetracarboxylic dianhydride (BPDA), and 23.547 grams of 4,4'-(hexafluoroisopropylidene)diphthalic anhydride (6FDA) are added thereto, and the mixture is stirred for 48 hours. Then, 4.86 grams of pyridine and 18.94 grams of acetic anhydride are added thereto, and the mixture is stirred for 24 hours to obtain a poly(amic acid-amide) copolymer solution, of which the solid content is 21.8 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a convention oven, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Comparative Example 1

152 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 13.446 grams of the 70 mol % of amide structural unit-containing oligomer prepared in Synthesis Example 1, and 13.199 g of 2,2'-bis(trifluoromethyl)benzidine (TFDB) are added thereto and dissolved, and the temperature is set to 25° C. Then, 2.125 grams of 3,3',4,4'-biphenyltetracarboxylic dianhydride (BPDA), and 19.230 grams of 4,4'-(hexafluoroisopropylidene)diphthalic anhydride (6FDA) are added thereto, and the mixture is stirred for 48 hours. Then, 4.0 grams of pyridine and 15.47 grams of acetic anhydride are added thereto, and the mixture is stirred for 24 hours to obtain a poly(amic acid-amide) copolymer solution, of which the solid content is 14 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a furnace, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 9

168 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 15.477 grams of the 70 mol % of amide structural unit-containing oligomer prepared in Synthesis Example 1, 12.660 g of 2,2'-bis(trifluoromethyl)benzidine (TFDB), and 0.976 g of hexamethylene diamine (HMDA) are added thereto and dissolved, and the temperature is set to 25° C. Then, 2.886 grams of 3,3',4,4'-biphenyltetracarboxylic dianhydride (BPDA), and 21.738 grams of 4,4'-(hexafluoroisopropylidene)diphthalic anhydride (6FDA) are added thereto, and the mixture is stirred for 48 hours. Then, 4.65 grams of pyridine and 17.99 grams of acetic anhydride are added thereto, and the mixture is stirred for 24 hours to obtain a poly(amic acid-amide) copolymer solution, of which the solid content is 11.3 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a furnace, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 10

168 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 16.347 grams of the 70 mol % of amide structural unit-containing oligomer prepared in Synthesis Example 1, 10.550 g of 2,2'-bis(trifluoromethyl)benzidine (TFDB), and 2.055 g of hexamethylene diamine (HMDA) are added thereto and dissolved, and the temperature is set to 25° C. Then, 3.048 grams of 3,3',4,4'-biphenyltetracarboxylic dianhydride (BPDA), and 22.959 grams of 4,4'-(hexafluoroisopropylidene)diphthalic anhydride (6FDA) are added thereto, and the mixture is stirred for 48 hours. Then, 4.91 grams of pyridine and 19.0 grams of acetic anhydride are added thereto, and the mixture is stirred for 24 hours to obtain a poly(amic acid-amide) copolymer solution, of which the solid content is 11.3 weight %.

After cooling the poly(amic acid-amide) solution to a temperature of 25° C., the solution is casted on a glass substrate, and dried for 40 minutes on a hot plate at a temperature of 100° C. Then, the film is separated from the glass substrate and introduced into a furnace, wherein the temperature is increased from the room temperature to 200° C., at a heating rate of 3° C. per minutes, maintained at 200° C. for about 20 minutes, and slowly cooled to room temperature to obtain a poly(amide-imide) copolymer film.

Example 11

150 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 11.514 grams of the 70 mol % of amide structural unit-containing oligomer prepared in Synthesis Example 1, and 8.495 g of hexamethylene diamine (HMDA) are added thereto and dissolved, and the temperature is set to 25° C. Then, 11.949 grams of 3,3',4,4'-biphenyltetracarboxylic dianhydride (BPDA), and 18.042 grams of 4,4'-(hexafluoroisopropylidene)diphthalic anhydride (6FDA) are added thereto, and the mixture is stirred for 48 hour. Then, 2.57 grams of pyridine and 19.90 grams of acetic anhydride are added thereto, and the mixture is stirred for 24 hours to obtain a poly(amic acid-amide) copolymer solution, of which the solid content is 22.5 weight %.

The obtained poly(amide-imide) copolymer solution becomes gelated as time goes on, and it is not possible to fabricate a film using the solution as whitening occurs.

Example 12

146 grams of N,N-dimethyl acetamide (DMAc) as a solvent is charged into a 4-neck double-walled 250 mL reactor equipped with a mechanical stirrer and a nitrogen inlet, while passing nitrogen gas through, and the temperature is set to 25° C. Then, 13.517 grams of the 70 mol % of amide structural unit-containing oligomer prepared in Synthesis Example 1, and 9.248 g of hexamethylene diamine (HMDA) are added thereto and dissolved, and the temperature is set to 25° C. Then, 16.388 grams of 3,3',4,4'-biphenyltetracarboxylic dianhydride (BPDA), and 14.846 grams of 4,4'-(hexafluoroisopropylidene)diphthalic anhydride (6FDA) are added thereto, and the mixture is stirred for 48 hours. Then, 2.82 grams of pyridine and 21.84 grams of acetic anhydride are added thereto, and the mixture is stirred for 24 hours to obtain a poly(amic acid-amide) copolymer solution, of which the solid content is 24 weight %.

The obtained poly(amide-imide) copolymer solution becomes gelated as time goes on, and it is not possible to fabricate a film using the solution as whitening occurs.

Evaluation: Evaluation of the Films

Each of the poly(amide-imide) copolymer films prepared in Examples 1 to 10 and Comparative Example 1 are evaluated for the composition, thickness, glass transition temperature, amount of remaining solvent, optical properties, and mechanical properties, and the obtained values are described in Table 1 below.

As for the optical properties, light transmittance in a wavelength range between 350 nanometers (nm) to 750 nm, YI, YI difference after exposure UV ray, and haze are measured.

As for the mechanical properties, toughness and tensile modulus are measured.

Thickness of film is determined by using Micrometer (Mitutoyo Com. Ltd.).

Glass transition temperature ($T_g$) is measured according to ASTM D3418 method by using DMA (Dynamic Mechanical Analyzer) Q800 apparatus.

An amount of solvent remained in a film is determined by using TGA (Thermogravimetric Analyzer) Q500, and by taking the decrease in weight in the region between 150° C. and 370° C. as the amount of solvent remained in a film.

Yellowness index (YI), light transmittance (at a wavelength range of 350 nm to 750 nm), and haze are measured for a film having a thickness of about 50 micrometers, according to an ASTM D1925 method by using a spectrophotometer, CM-3600d made by Konica Minolta Inc. YI difference ($\Delta$YI) after and before exposure to UV light is measured as the YI difference after and before exposure to an ultraviolet (UV) lamp of a UVB wavelength region for 72 hours.

Tensile modulus is measured for a sample of a film having a width of 10 millimeters (mm) and a length of 50 mm by elongating each sample at a rate of 0.5 mm/minute at the room temperature five times, according to ASTM D882 method by using Instron 3365 apparatus.

Toughness is measured according to an ASTM D882 method, and is determined by calculating the total area by multiplying the X axis for strain and the Y axis for stress.

TABLE 1

| | Composition | thickness [µm] | Tg [° C.] | Solvent remained [%] | Tr [%] | Haze (%) | YI | ΔYI | Tensile modulus [GPa] | Toughness [Joule · m$^{-3}$ · 10$^4$] |
|---|---|---|---|---|---|---|---|---|---|---|
| Comparative Example 1 | TPCI/6FDA/BPDA/TFDB = 30/60/10/100 | 52 | 353.5 | 3 | 89.8 | 0.2 | 1.66 | 0.76 | 4.3 | 550.7 |
| Example 9 | TPCI/6FDA/BPDA/TFDB/HMDA = 30/60/10/90/10 | 48 | 323.3 | 2.8 | 89.8 | 0.2 | 1.59 | 0.66 | 4.7 | 669.4 |
| Example 10 | TPCI/6FDA/BPDA/TFDB/HMDA = 30/60/10/80/20 | 46 | 292.9 | 2.4 | 89.8 | 0.1 | 1.54 | 0.50 | 4.6 | 870.2 |
| Example 1 | TPCI/6FDA/BPDA/TFDB/HMDA = 30/60/10/70/30 | 50 | 267.9 | 1.8 | 89.6 | 0.3 | 1.56 | 0.57 | 4.7 | 1498.2 |
| Example 2 | TPCI/6FDA/BPDA/TFDB/HMDA = 30/60/10/60/40 | 49 | 250.5 | 1.6 | 89.7 | 0.7 | 1.50 | 0.43 | 4.5 | 1658.3 |
| Example 3 | TPCI/6FDA/BPDA/TFDB/HMDA = 30/60/10/50/50 | 44 | 227.3 | 1.3 | 89.9 | 0.4 | 1.39 | 0.45 | 4.2 | 1862.6 |
| Example 4 | TPCI/6FDA/BPDA/TFDB/HMDA = 30/60/10/43/57 | 52 | 223.2 | 1.3 | 89.9 | 0.3 | 1.59 | 0.65 | 4.1 | 1876.3 |
| Example 5 | TPCI/6FDA/BPDA/TFDB/HMDA = 20/70/10/50/50 | 55 | 231.7 | 1.2 | 89.8 | 0.5 | 1.56 | 0.72 | 4.1 | 1858.4 |
| Example 6 | TPCI/6FDA/BPDA/TFDB/HMDA = 20/70/10/30/70 | 55 | 206.1 | 0.9 | 89.9 | 0.4 | 1.58 | 0.54 | 3.8 | 1923.6 |
| Example 7 | TPCI/6FDA/BPDA/TFDB/HMDA = 20/70/10/28/72 | 55 | 189.1 | 0.7 | 90.3 | 0.3 | 1.55 | 1.03 | 3.5 | 1950.4 |
| Example 8 | TPCI/6FDA/BPDA/TFDB/HMDA = 10/80/10/20/80 | 55 | 178.1 | 0.6 | 89.8 | 0.5 | 1.53 | 0.92 | 3.4 | 2200.4 |

As shown in Table 1, the films prepared by including the linear aliphatic diamine, HMDA (hexamethylene diamine) in an amount from 30 mol % to 80 mol % according to Examples 1 to 8 have increased tensile moduli, and moreover, increased toughness by more than 2 times, compared with the film according to Comparative Example 1, which is prepared by not including the linear aliphatic diamine. Meanwhile, when compared with the films according to Examples 9 and 10, which are prepared by including less than or equal to 20 mol % of HMDA, the films according to Examples 1 to 8 show hardly changed tensile moduli or a slightly decreased tensile moduli, while greatly increased toughness.

Further, while the film according to Comparative Example 1, which does not included HMDA, has a $T_g$ of greater than 350° C., the film according to Example 1, which includes HMDA in an amount of 30 mol %, has a $T_g$ of 267.9° C., the $T_g$ decreases as much as about 100° C. As the amount of HMDA increases as in Examples 2 to 10, toughness increases and $T_g$ decreases. As $T_g$ of the films according to Examples 1 to 10 decreases, the amount of solvent remained in the films decreases. While the amount of solvent of the film according to Comparative Example 1, which does not include HMDA, is 3%, the film according to Example 1 that includes HMDA in an amount of 30 mol % has 1.8% of the solvent remained in the film. That is, as the amount of HMDA increases, the amount of solvent remained decreases by less than a half.

Meanwhile, as described above, the films according to Examples 1 to 10 maintain good optical properties, while having improved mechanical properties, such as, for example, toughness. The films according to Examples 1 to 10 have transmittance of greater than or equal to 89%, which is equivalent or in some cases (Examples 3, 4, 6, and 7) superior to the films according to Comparative Example 1, which does not include HMDA. YI is also maintained as the films according to Examples 1 to 10 have a YI less than or equivalent to the YI value of the film according to Comparative Example 1. YI difference (ΔYI) and haze of the films according to Examples 1 to 10 are also maintained compared with that according to Comparative Example 1.

As a result, the poly(amide-imide) copolymer prepared by including a linear aliphatic diamine along with an aromatic diamine has improved mechanical properties, such as, for example, a toughness, while maintaining good optical properties, as well as having a lowered $T_g$ to decrease a process temperature for fabricating a film. Further, the poly(amide-imide) copolymer film according to an embodiment that has a lowered $T_g$ has decreased solvent remained in the film due to the lowered $T_g$.

As described above, the poly(amide-imide) copolymer according to an embodiment prepared by reacting an aromatic diamine, an aromatic tetracarboxylic dianhydride, and an aromatic dicarbonyl compound, as well as a linear aliphatic diamine, has improved mechanical properties, such as, for example, a toughness, while maintaining good optical properties, and has a lowered $T_g$ to reduce a process temperature, which leads to the cost reduction, as well as reduction of the amount of solvent remained in the final article prepared from the poly(amide-imide) copolymer to have a more improved quality. Accordingly, the article having good optical and mechanical properties may be advantageous for use in a display device, such as, for example, a flexible display device.

While this disclosure has been described in connection with what is presently considered to be practical exemplary embodiments, it is to be understood that the present disclosure is not limited to the embodiments presented herein, but on the contrary, is intended to cover various modifications and equivalent arrangements included within the spirit and scope of the appended claims.

What is claimed is:

1. A composition for preparing a poly(amide-imide) copolymer comprising a substituted or unsubstituted linear aliphatic diamine, a compound represented by Chemical Formula 4, and a tetracarboxylic acid dianhydride comprising a combination of a compound represented by Chemical Formula 3-1 and a compound represented by Chemical Formula 3-2, and a solvent:

Chemical Formula 4

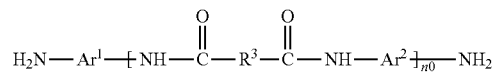

wherein, in Chemical Formula 4,
$R^3$ is a substituted or unsubstituted phenylene or a substituted or unsubstituted biphenylene group,
n0 is a number greater than or equal to 1, and
$Ar^1$ and $Ar^2$ are each independently represented by Chemical Formula 5:

Chemical Formula 5

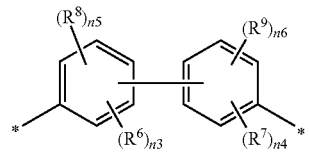

wherein, in Chemical Formula 5,
$R^6$ and $R^7$ are each independently an electron withdrawing group selected from —$CF_3$, —$CCl_3$, —$CBr_3$, —$Cl_3$, —$NO_2$, —CN, —C(=O)$CH_3$, and —$CO_2C_2H_5$,
$R^8$ and $R^9$ are each independently a halogen, a hydroxy group, a substituted or unsubstituted C1 to C10 aliphatic organic group, a substituted or unsubstituted C6 to C20 aromatic organic group, an alkoxy group of formula —$OR^{204}$, wherein $R^{204}$ is a C1 to C10 aliphatic organic group, or a silyl group of formula —$SiR^{205}R^{206}R^{207}$ wherein —$R^{205}$, $R^{206}$, and $R^{207}$ are each independently hydrogen or a C1 to C10 aliphatic organic group,
n3 is an integer ranging from 1 to 4, n5 is an integer ranging from 0 to 3, provided that n3+n5 is an integer ranging from 1 to 4, and
n4 is an integer ranging from 1 to 4, n6 is an integer ranging from 0 to 3, provided that n4+n6 is an integer ranging from 1 to 4;

Chemical Formula 3-1

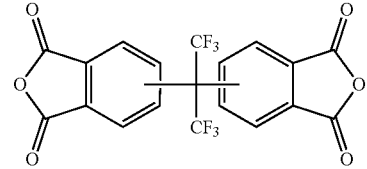

Chemical Formula 3-2

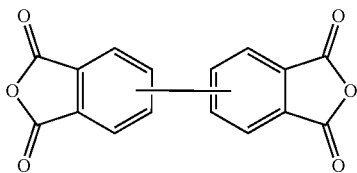

2. The composition for preparing a poly(amide-imide) copolymer according to claim 1, wherein the substituted or unsubstituted linear aliphatic diamine comprises two terminals, wherein the substituted or unsubstituted linear aliphatic diamine comprises an amino group located at each end of the two terminals thereof, and wherein the substituted or unsubstituted linear aliphatic diamine is a substituted or unsubstituted C1 to C30 saturated or unsaturated linear aliphatic diamine.

3. The composition for preparing a poly(amide-imide) copolymer according to claim 1, wherein the substituted or unsubstituted linear aliphatic diamine comprises two terminals, wherein the substituted or unsubstituted linear aliphatic diamine comprises an amino group located at each end of the two terminals thereof, and wherein the substituted or unsubstituted linear aliphatic diamine is a substituted or unsubstituted C1 to C20 saturated linear aliphatic diamine.

4. The composition for preparing a poly(amide-imide) copolymer according to claim 1, wherein the substituted or unsubstituted linear aliphatic diamine is selected from methylene diamine, ethylene diamine, 1,3-propane diamine, 1,4-tetramethylene diamine, 1,5-pentamethylene diamine, 1,6-hexamethylene diamine, 1,7-heptamethylene diamine, 1,8-octamethylene diamine, 1,9-nanomethylene diamine, 1,10-decamehtylene diamine, 1,11-undecamethylene diamine, 1,12-dodecamethylene diamine, and a combination thereof.

5. The composition for preparing a poly(amide-imide) copolymer according to claim 1, wherein the composition further comprises a diamine represented by Chemical Formula 1:

$NH_2$-A-$NH_2$    Chemical Formula 1 wherein in Chemical Formula 1,
A is a ring system comprising two or more C6 to C30 aromatic rings linked by a single bond, wherein each of the two or more aromatic rings is independently unsubstituted or substituted by an electron-withdrawing group.

6. The composition for preparing a poly(amide-imide) copolymer according to claim 5, wherein the diamine represented by Chemical Formula 1 comprises a ring system comprising two C6 to C12 aromatic rings linked by a single bond, wherein each of the two C6 to C12 aromatic rings are independently substituted by an electron-withdrawing group selected from a halogen atom, a nitro group, a cyano group, a C1 or C2 haloalkyl group, a C2 to C6 alkanoyl group, and a C2 to C6 ester group.

7. The composition for preparing a poly(amide-imide) copolymer according to claim 5, wherein the diamine represented by Chemical Formula 1 comprises at least one selected from the diamines represented by chemical formulae:

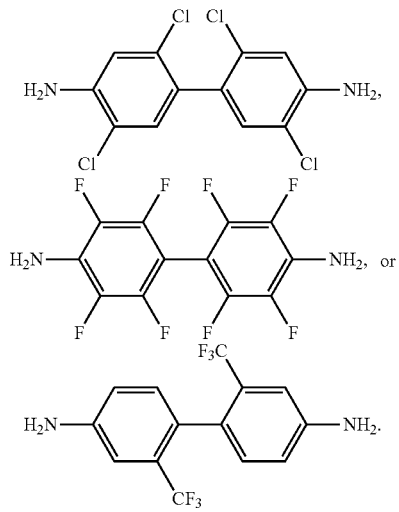

8. The composition for preparing a poly(amide-imide) copolymer according to claim 5, wherein the diamine represented by Chemical Formula 1 comprises a diamine represented by Chemical Formula A:

Chemical Formula A

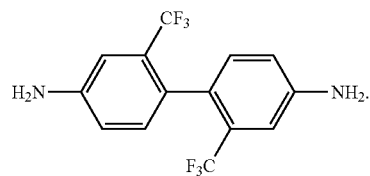

9. The composition for preparing a poly(amide-imide) copolymer according to claim 1, wherein in Chemical Formula 4, $R^3$ is a phenylene group.

10. The composition for preparing a poly(amide-imide) copolymer according to claim 1, wherein the compound represented by Chemical Formula 3-1 comprises 4,4-(hexafluoroisopropylidene)diphthalic anhydride (6FDA), and the compound represented by Chemical Formula 3-2 comprises 3,3',4,4'-biphenyl tetracarboxylic dianhydride (BPDA).

11. The composition for preparing a poly(amide-imide) copolymer according to claim 1, wherein the compound represented by Chemical Formula 4 is prepared by reacting a diamine represented by Chemical Formula 1 and a dicarbonyl compound represented by Chemical formula 2, and wherein the substituted or unsubstituted linear aliphatic diamine is present in an amount of greater than 20 mole percent and less than 90 mol percent based on the total mole numbers of diamines that include the diamine represented by Chemical Formula 1 to be used to prepare the compound represented by Chemical Formula 4 and the substituted or unsubstituted linear aliphatic diamine present in the composition:

$NH_2$-A-$NH_2$    Chemical Formula 1 wherein in Chemical Formula 1,
A is a ring system comprising two or more C6 to C30 aromatic rings linked by a single bond, wherein each of the two or more aromatic rings is independently unsubstituted or substituted by an electron-withdrawing group;

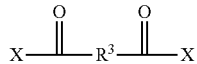

Chemical Formula 2 wherein, in Chemical Formula 2,
$R^3$ is a substituted or unsubstituted phenylene or a substituted or unsubstituted biphenylene group, and
each X is an identical or different halogen atom.

12. An article comprising a poly(amide-imide) copolymer prepared from the composition according to claim 1.

13. The article according to claim 12, wherein the article comprises a film, and wherein the film has a toughness of greater than or equal to 1,000 Joules×reverse cubic meters× $10_4$ (Joul·m$^{-3}$·$10^4$), when the film has a thickness of about 30 micrometers to about 100 micrometers.

14. A window film for a display device comprising a poly(amide-imide) copolymer prepared from the composition according to claim 1.

15. A display device comprising the article according to claim 12.

16. The display device according to claim 6, wherein the display device comprises a flexible display device.

17. A display device comprising the window film according to claim 14.

* * * * *